United States Patent
Miyabayashi (10) Patent No.: US 8,040,972 B2
(45) Date of Patent: Oct. 18, 2011

(54) WIRELESS COMMUNICATION APPARATUS AND METHOD, AND SIGNAL ATTENUATION PREDICTION APPARATUS AND METHOD

(75) Inventor: Naoki Miyabayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 891 days.

(21) Appl. No.: 11/654,185

(22) Filed: Jan. 16, 2007

(65) Prior Publication Data

US 2007/0171996 A1    Jul. 26, 2007

(30) Foreign Application Priority Data

Jan. 25, 2006   (JP) ................ 2006-016800

(51) Int. Cl.
H04L 25/49    (2006.01)
(52) U.S. Cl. .................................... 375/296
(58) Field of Classification Search ............... 375/295, 375/296; 398/193; 455/114.3
See application file for complete search history.

(56) References Cited

U.S. PATENT DOCUMENTS

| | | | | |
|---|---|---|---|---|
| 6,859,503 B2 * | 2/2005 | Pautler et al. | ........... | 375/299 |
| 7,046,644 B1 * | 5/2006 | Lappetelainen | ........... | 370/329 |
| 7,400,674 B2 * | 7/2008 | Gu | ........... | 375/225 |
| 2003/0185309 A1 * | 10/2003 | Pautler et al. | ........... | 375/257 |
| 2006/0067276 A1 * | 3/2006 | Bi et al. | ........... | 370/333 |
| 2006/0078061 A1 * | 4/2006 | Horisaki | ........... | 375/261 |

FOREIGN PATENT DOCUMENTS

| | | |
|---|---|---|
| JP | 07-1430147 | 6/1995 |
| JP | 11-355373 | 12/1999 |
| JP | 2002-290246 | 10/2002 |
| JP | 2004-072666 | 3/2004 |
| JP | 2005-117303 | 4/2005 |

* cited by examiner

*Primary Examiner* — Sam K Ahn
(74) *Attorney, Agent, or Firm* — Robert J. Depke; Rockey, Depke & Lyons, LLC (57) ABSTRACT

A wireless communication apparatus that transmits a transmission signal and receives a reception signal via a wireless transmission channel, the wireless communication apparatus including circuitry for determining an expected signal attenuation along the wireless transmission channel, stored information providing correlation between a transmission level of the transmission signal into a first power consumption parameter for each possible modulation method, stored information providing correlation between an expected signal strength for a received signal into a second power consumption parameter for each possible modulation method, and a means for determining the modulation method and the level of the transmission signal that minimizes power consumption.

13 Claims, 9 Drawing Sheets

WIRELESS COMMUNICATION APPARATUS AND METHOD, AND SIGNAL ATTENUATION PREDICTION APPARATUS AND METHOD

CROSS REFERENCES TO RELATED APPLICATIONS

The present invention contains subject matter related to Japanese Patent Application JP 2006-016800 filed in the Japanese Patent Office on Jan. 25, 2006, the entire contents of which being incorporated herein by reference.

BACKGROUND OF THE INVENTION

1. Field of the Invention

The present invention relates to an apparatus and method using wireless communication, such as a wireless LAN (Local Area Network), and a signal attenuation prediction apparatus and method.

2. Description of the Related Art

In recent years, battery-driven terminals having wireless communication capabilities have been widely used. An example of the wireless communication capability may be a wireless LAN (Local Area Network), such as IEEE 802.11a/b/g.

In related art, a major challenge of a desktop wireless communication instrument that uses transmitting and receiving terminals having a fixed distance therebetween is maximization of communication speed and improvement of stability, while a challenge of a battery-driven mobile terminal is increase in continuous operating time without recharging as well as maximization of communication speed and improvement of stability. That is, in a battery-driven wireless LAN device, reduction in power consumption is a major challenge to address.

As one effective method for reducing power consumption, attention is given to a control method for optimizing transmission power according to the transmission channel characteristic. Intuitively speaking, it is easily conceivable that transmitting and receiving terminals communicate with each other using relatively low transmission power when they are within a short distance, while these terminals use higher transmission power as the distance between them increases, so as to reduce unnecessary transmission power. That is, when data is sent, transmission power is controlled such that power consumption is minimized on the transmitter side to the extent that the receiver may always normally receive packets, thereby allowing reduced unnecessary power consumption.

JP-A-7-143047 describes a wireless relay apparatus that, whenever the receiver receives a signal, feeds the level of the signal back to the transmitting side so as to update the transmission signal level to an appropriate value. JP-A-2005-117303 describes a method for determining optimum transmission power in wireless LAN communication when reception power intensity and PER (Packet Error Rate) is obtained.

Focusing on IEEE 802.11h, it defines TPC (Transmit Power Control) as measures to minimize radio interference into neighboring areas and describes the possibility of reducing power consumption of a TPC-implemented transmission terminal. Particularly, "Energy-Efficient PCF Operation of IEEE 802.11a Wireless LAN", Qiao, etc, IEEE INFOCOM 2002 (hereinafter referred to as "Qiao"), which was used as a reference material in the standardization drafting work, analyzes in detail the power saving effect in a TPC-operated mobile terminal. "Qiao" describes that an equation for evaluating power consumption per transmission bit is derived using two variables of the modulation method and transmission power, and significant power consumption reduction can be achieved when an optimum modulation method and transmission power are given from the evaluation equation.

SUMMARY OF THE INVENTION

However, JP-A-7-143047 and JP-A-2005-117303 only describes how to control transmission power but does not describe how to select from a plurality of modulation methods (including selection of an error correction code rate) defined in the wireless LAN. In practice, since the reception characteristic depends on the modulation method, the transmission power level necessary for normal reception differs for each modulation method. Therefore, to minimize power consumption, it is necessary to combine a settable transmission power range and every modulation method in an optimum manner.

"Qiao" dose not describe how to derive an optimum solution of the power consumption evaluation equation. Particularly, it is difficult to determine the optimum solution in an efficient manner because the evaluation equation contains a discontinuous function. For example, to determine the optimum solution, possible parameter values are substituted into the evaluation equation in a brute force manner and the calculation results are compared to narrow the optimum solution, which may require enormous calculation, so that it is difficult to save power.

In view of the above, it is desirable to provide a wireless communication apparatus and method as well as a signal attenuation prediction apparatus and method for reducing calculation load of combining a modulation mode and transmission power and efficiently deriving the optimum combination.

According to an embodiment of the invention, there is provided a wireless communication apparatus that transmits a transmission signal and receives a reception signal via a wireless transmission line. The wireless communication apparatus includes prediction means for predicting the amount of signal attenuation along the wireless transmission line, a first conversion table that converts the level of the transmission signal into a first power consumption calculation parameter for each modulation method for the transmission signal, a second conversion table that converts C/N of the transmission signal into a second power consumption calculation parameter for each modulation method for the transmission signal, calculation means for calculating the modulation method and the level of the transmission signal that provide minimum power consumption based on the amount of signal attenuation predicted by the prediction means, the first conversion table and the second conversion table, and control means for controlling the modulation method and the level of the transmission signal based on the calculation result calculated by the calculation means.

According to another embodiment of the invention, there is provided a wireless communication method for transmitting a transmission signal and receiving a reception signal via a wireless transmission line. The wireless communication method includes the steps of predicting the amount of signal attenuation along the wireless transmission line, calculating the modulation method and the level of the transmission signal that provide minimum power consumption based on the amount of signal attenuation predicted at the predicting step, a first conversion table that converts the level of the transmission signal into a first power consumption calculation parameter for each modulation method for the transmission signal, and a second conversion table that converts C/N of the transmission signal into a second power consumption calculation parameter for each modulation method for the transmission signal, and controlling the modulation method and the level of the transmission signal based on the calculation result calculated at the calculating step.

According to another embodiment of the invention, there is provided a wireless communication apparatus that transmits a transmission signal and receives a reception signal via a wireless transmission line. The wireless communication apparatus includes prediction means for predicting predicted C/N of the transmission signal according to measured C/N obtained by measuring the reception signal, and when the difference between the predicted packet error rate according to the predicted C/N and the measured packet error rate obtained by measuring the reception signal is larger than a certain threshold value, correcting the predicted C/N and predicting the amount of signal attenuation, calculation means for calculating the modulation method and the level of the transmission signal that provide minimum communication power consumption based on the amount of signal attenuation predicted by the prediction means, and control means for controlling the modulation method and the level of the transmission signal based on the calculation result calculated by the calculation means.

According to another embodiment of the invention, there is provided a wireless communication method for transmitting a transmission signal and receiving a reception signal via a wireless transmission line. The wireless communication method includes the steps of predicting predicted C/N of the transmission signal according to measured C/N obtained by measuring the reception signal, and when the difference between the predicted packet error rate according to the predicted C/N and the measured packet error rate obtained by measuring the reception signal is larger than a certain threshold value, correcting the predicted C/N and predicting the amount of signal attenuation, calculating the modulation method and the level of the transmission signal that provide minimum communication power consumption based on the amount of signal attenuation predicted at the predicting step and controlling the modulation method and the level of the transmission signal based on the calculation result calculated at the calculating step.

According to another embodiment of the invention, there is provided a signal attenuation prediction apparatus that predicts the amount of signal attenuation along a wireless transmission line. The signal attenuation prediction apparatus includes C/N prediction means for predicting predicted C/N of a transmission signal to be transmitted via the wireless transmission line according to measured C/N obtained by measuring the reception signal received via the wireless transmission line, correction means for, when the difference between the predicted packet error rate according to the predicted C/N and the measured packet error rate obtained by measuring the reception signal is larger than a certain threshold value, increasing or decreasing the predicted C/N according to the comparison result between the predicted packet error rate and the measured packet error rate so as to correct the predicted C/N, and signal attenuation prediction means for predicting the amount of signal attenuation based on the predicted C/N.

According to another embodiment of the invention, there is provided a signal attenuation prediction method for predicting the amount of signal attenuation along a wireless transmission line. The signal attenuation prediction method includes the steps of predicting predicted C/N of a transmission signal to be transmitted via the wireless transmission line according to measured C/N obtained by measuring the reception signal received via the wireless transmission line, when the difference between the predicted packet error rate according to the predicted C/N and the measured packet error rate obtained by measuring the reception signal is larger than a certain threshold value, increasing or decreasing the predicted C/N according to the comparison result between the predicted packet error rate and the measured packet error rate so as to correct the predicted C/N, and predicting the amount of signal attenuation based on the predicted C/N.

According to an embodiment of the invention, by predicting the amount of signal attenuation along a wireless transmission line and calculating the modulation method and the level of the transmission signal that provides minimum communication power consumption based on the predicted amount of signal attenuation, the optimum combination of the modulation mode and the transmission power can be efficiently derived with less calculation load.

DESCRIPTION OF THE PREFERRED
EMBODIMENTS

A specific embodiment of the invention will be described below in detail with reference to the drawings. Although the embodiment will be described with reference to a wireless LAN (Local Area Network), the embodiment is not limited thereto.

A wireless LAN can be built either using the infrastructure mode or the ad hoc mode. Although the invention can be adapted to either network, the following description will be made with reference to the infrastructure mode. The DCF (Distributed Coordination Function) mode or the PCF (Point Coordination Function) mode will be used as the access method during data transmission, and the following description will be made with reference to the PCF mode.

Figure 1:
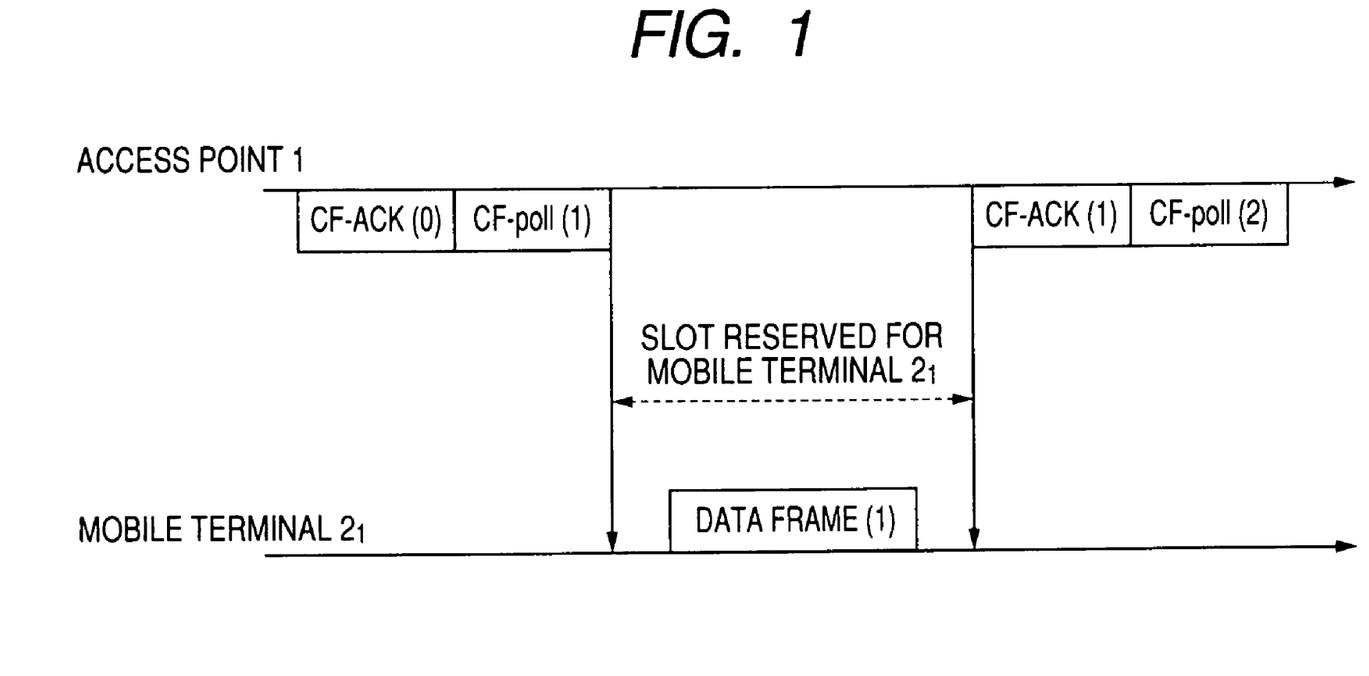
FIG. 1 explains how to transmit data in a wireless LAN operated in the PCF mode.

FIG. 1 explains how to transmit data from a mobile terminal 2 to an access point 1 in a wireless LAN operated in the PCF mode. As shown in FIG. 1, the access point 1 multicasts Poll frames containing the MAC address of the mobile terminal 2 to all mobile terminals $2_0$ to $2_n$ connected to the network. After the Poll frame (1) was transmitted, a fixed period is reserved as the transmission period for the mobile terminal $2_1$, so that the mobile terminal $2_1$ can transmit desired data up to 2312 bytes to the access point 1. When the access point 1 normally receives the packet transmitted from the mobile terminal $2_1$, the access point 1 responds to the mobile terminal $2_1$ by sending an Ack frame (1) and completes the data transmission.

Figure 2A:
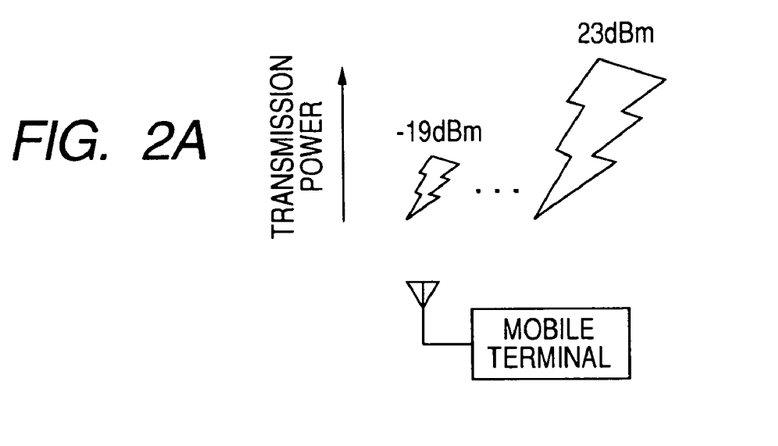
FIGS. 2A and 2B are conceptual views of examples of parameters to be controlled in order to reduce power consumption.
Figure 2B:
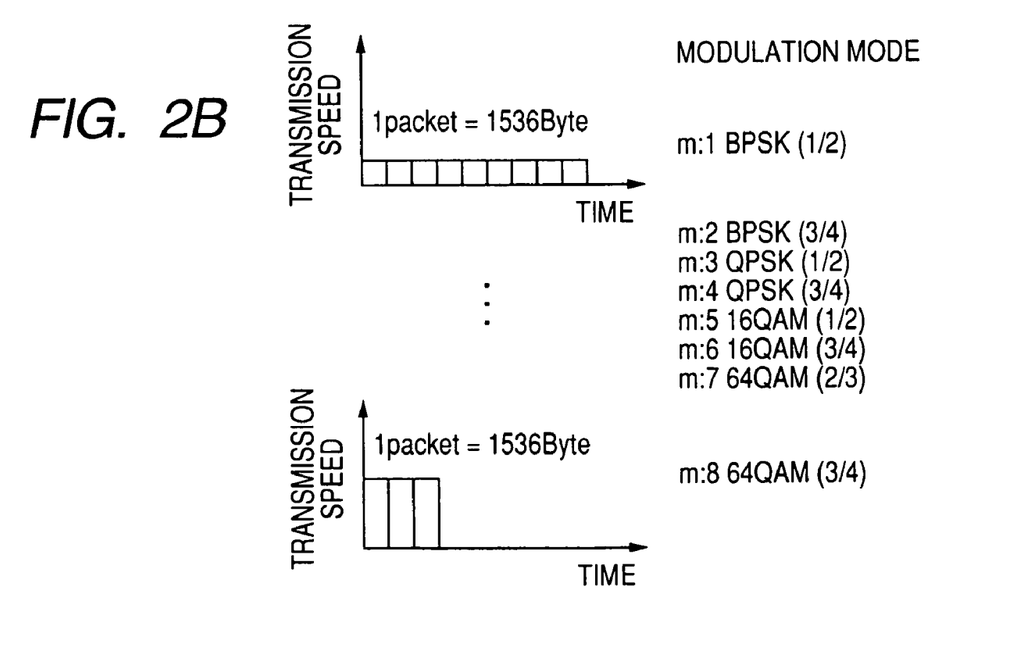

FIGS. 2A and 2B are conceptual views of examples of parameters to be controlled in order to reduce power consumption. For example, as shown in FIG. 2A, transmission power sent from an antenna is one of the parameters to be controlled in order to reduce power consumption. The transmission power sent from an antenna is defined, for example, in the range of −19 to 23 dBm. Higher transmission power allows longer transfer distance, but increases power consumption in a power amplifier (PA).

As shown in FIG. 2B, the modulation mode defined in IEEE 802.11a/g is also one of the parameters to be controlled in order to reduce power consumption. For example, eight modulation modes (m−1 to 8) including selection of the error correction code rate are defined, that is, BPSK(½), BPSK(¾), QPSK(½), QPSK(¾), 16QAM(½), 16QAM(¾), 64QAM(⅔) and 64QAM(¾). When the modulation mode is changeable and a modulation mode with a high data transmission speed is selected, transmission power will be reduced because the transmission period per unit data becomes shorter, but C/N necessary for correct reception becomes higher.

The wireless communication apparatus shown as the specific example of the invention optimizes the parameters described above to minimize the amount of power consumption when the mobile terminal 2 transmits data to the access point 1.

Figure 3:
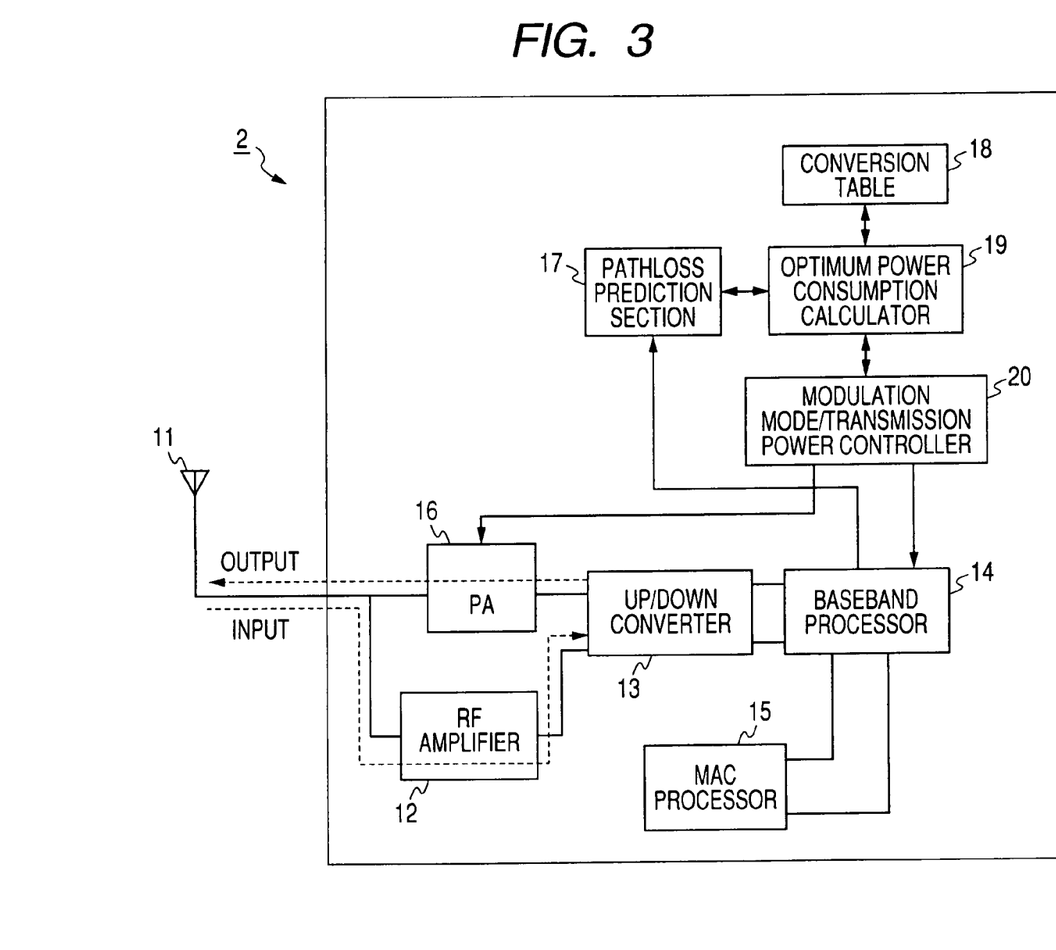
FIG. 3 is a block diagram showing an exemplary configuration of a mobile terminal 2 to which the invention is applied.

FIG. 3 is a block diagram showing an exemplary configuration of the mobile terminal 2. The mobile terminal 2 includes an antenna 11, an RF amplifier 12, an up/down converter 13, a baseband processor 14, a MAC processor 15, a power amplifier (PA) 16, a Pathloss prediction section 17, a conversion table 18, an optimum power consumption calculator 19 and a modulation mode/transmission power controller 20.

The antenna 11 transmits and receives an RF signal, and the RF amplifier 12 amplifies the RF signal received by the antenna 11.

The up/down converter 13 changes the frequency band of the inputted and outputted signal. For example, the up/down converter 13 converts a baseband signal into an RF-band transmission signal.

The baseband processor 14 performs demodulation and error correction on the received signal processed in the up/down converter 13 to generate a baseband signal. The baseband processor 14 also performs error correction and modulation on a baseband signal to be transmitted.

The MAC processor 15 has the MAC address, which is an ID number specific to the mobile terminal 2, and transmits and receives a data frame based on the MAC address.

The power amplifier (PA) 16 amplifies the RF signal processed in the up/down converter 13 and supplies the amplified signal to the antenna.

The Pathloss prediction section 17 uses, for example, a reception sensitivity measurement result measured on the receiver side (the access point 1 in this case) or a reception sensitivity and PER (Packet Error Rate) measurement result obtained in the mobile terminal 2, so as to predict the amount of signal attenuation along the transmission line. These measurement results are defined in IEEE 802.11h.

The conversion table 18 stores a power consumption table for transmission power and modulation methods, as will be described later.

The optimum power consumption calculator 19 uses the power consumption table for transmission power and modulation methods stored in the conversion table 18 to perform evaluation calculation of power consumption based on the amount of signal attenuation along the transmission line predicted in the Passloth prediction section 17.

The modulation mode/transmission power controller 20 controls the modulation method used in the baseband processor 14 based on the evaluation calculation result on the power consumption obtained from the optimum power consumption calculator 19 and also controls the amplification of the transmission signal in the PA 16.

The RF amplifier 12 amplifies a weak RF signal received by the antenna 11, and the up/down converter 13 reduces frequency band of the amplified RF signal, which is then inputted to the baseband processor 14. The baseband processor 14 performs demodulation and error correction on the inputted signal to generate a baseband signal.

On the other hand, when an RF signal is transmitted, the baseband processor 14 performs necessary error correction and modulation on the RF signal and the up/down converter 13 converts the processed signal into an RF-band transmission signal. The transmission signal is then amplified in the PA 16 and sent from the antenna 11. In transmitting the signal, the modulation mode/transmission power controller 20 sets the modulation method used in the baseband processor 14 such that minimum power consumption is achieved, and controls the PA 16 to amplify the transmission signal based on the evaluation calculation result on the power consumption calculated in the optimum power consumption calculator 19.

Next, a description will be made of optimizing control of the transmission power level and the modulation method including an error correction method by which power consumption is minimized. In this embodiment, the amount of power consumption is formulated for each component of the mobile terminal 2 described above and the total power consumed in all components will be evaluated. Then, an evaluation equation, which will be described later, is used to determine the transmission power and the modulation method such that power consumption per bit necessary for accurately receiving a data packet sent from the mobile terminal 2 is minimized.

Firstly, as described in "Qiao", each component block in the mobile terminal 2 described above is evaluated from a power consumption point of view and the attainable minimum power consumption is determined using the parameters of the transmission power and the modulation method. Specifically, each component block is replaced with a power consumption equation to determine the total amount of power consumed for transmitting a series of packets.

The instantaneous power Ptx during transmission and the instantaneous power Prx during reception are approximated by the following evaluation equations.

$$Prx = Pcom + Prf \tag{1}$$

$$Ptx(Pout) = Pcom + Pout/\eta(Pout) \tag{2}$$

Figure 4:
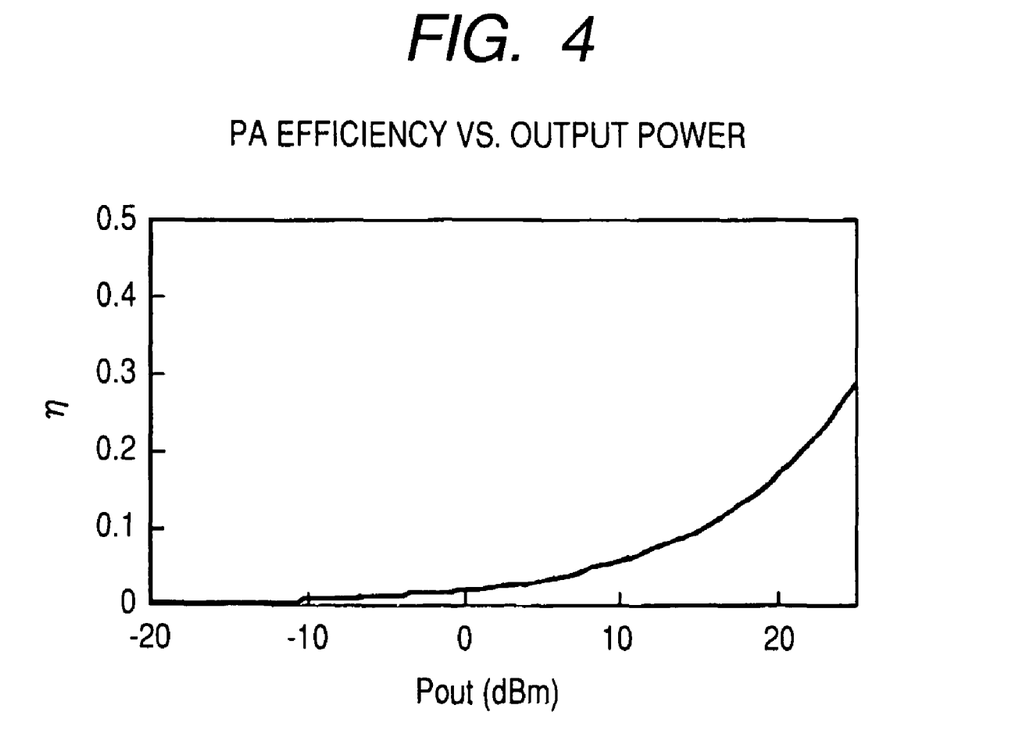
FIG. 4 is a graph obtained by plotting values of the efficiency η vs. values of the transmission power level Pout.

Pcom is the power consumed in the baseband processor 14 and the MAC processor 15, and assumed to be the same value during transmission and reception. Prf represents the power consumed in the RF amplifier 12, and Pout represents the power level sent from the antenna 11. The PA 16 is assumed to amplify power according to the efficiency η that depends on the transmission power level Pout, as shown in FIG. 4. In this description, when the mobile terminal 2 is not performing transmission or reception, the wireless LAN device goes into a Doze mode in which the wireless LAN device operates at very low power, and the evaluation equation gives zero power consumption.

Figure 5:
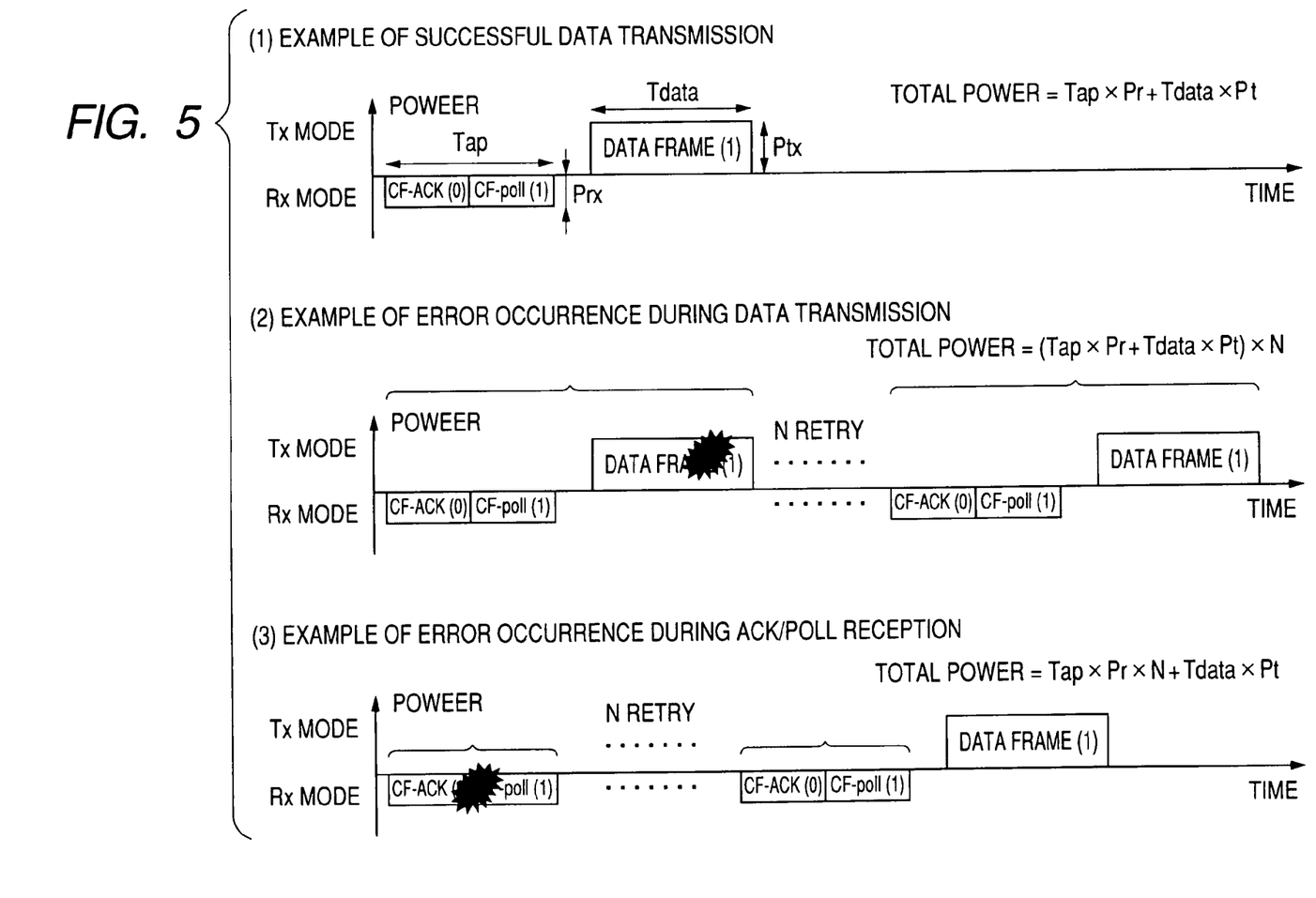
FIG. 5 diagrammatically shows error occurrence patterns during packet transmission.

The wireless LAN is designed to perform retransmission when an error occurs during packet transmission, and uses different packet transmission procedures for respective error occurrence patterns. (1) to (3) in FIG. 5 show data transmission patterns. (1) in FIG. 5 shows the case where the data transmission has been successful on the first try. In this case, the total amount of power is the sum of the amount of power $(T_{ap} \times Prx)$ during reception (Rx mode) and the amount of power $(T_{data} \times Ptx)$ during transmission (Tx mode).

Error occurrence during transmission is roughly categorized into the case where an error occurs during data packet transmission and the data packet is retransmitted as shown in (2) in FIG. 5 and the case where an error occurs during Ack/poll transmission and the data packet is retransmitted as shown in (3) in FIG. 5. It is also conceivable that the combination of the above two errors creates errors and the packet is retransmitted N times in total, which is the number of errors. Taking into account these error occurrence patterns, the power consumption necessary for transmitting each one bit can be calculated as follows:

$$J = \frac{\epsilon_{data}}{8 \cdot L} \text{(Joule per Bit)} \quad (3)$$

$$\epsilon_{data} = \sum_{i=1}^{\infty} P[n=i] \cdot i \cdot \bar{\epsilon}_{re-xmit} + \quad (4)$$

$$T_{data}^m(L) \cdot P_{tx}(P_{out}) + (T_{ack/poll}^m + 2 \cdot aSIFSTime) \cdot P_{rx}$$

$$\bar{\epsilon}_{re-xmit} = \frac{(1 - P_{e,ack/poll}^m) \cdot P_{e,data}^m(L)}{1 - P_{good-cycle}^m(L)} \cdot [T_{data}^m(L) \cdot P_{tx}(P_{out}) + \quad (5)$$

$$(T_{ack/poll}^m + 2 \cdot aSIFSTime) \cdot P_{rx}] +$$

$$\frac{P_{e,ack/poll}^m}{1 - P_{good-cycle}^m(L)} [(T_{ack/poll}^m + 2 \cdot aSIFSTime) \cdot P_{rx}]$$

Wherein, J represents the average amount of power consumption per bit. $\epsilon_{data}$ represents the average amount of power consumption necessary for normally receiving a packet having a length of L bytes. $\bar{\epsilon}_{re-xmit}$ represents the average amount of power consumption necessary for retransmission. m represents the eight modulation modes described above (m=1 to 8).

$T^m_{data}(L)$, $T^m_{ack/poll}$, $P^m_{e,data}(L)$, $P^m_{e,ack/poll}$, $P^m_{good-cycle}(L)$ and aSIFSTime are defined as follows, respectively:

$T^m_{data}(L)$: the time necessary for transmitting the data packet having a length of L bytes using the modulation mode m $T^m_{ack/poll}$: the time necessary for transmitting the Ack/Poll frames using the modulation mode m $P^m_{e,data}(L)$: the error occurrence probability when the data packet having a length of L bytes is transmitted using the modulation mode m $P^m_{e,ack/poll}$: the error occurrence probability when the Ack/Poll frames are transmitted using the modulation mode m $P^m_{good-cycle}(L)$: the normally received probability when the data packet having a length of L bytes and the Ack/Poll frames are transmitted using the modulation mode m aSIFSTime: the time necessary for SIFS The equation (3) shows the average power consumption necessary for transmitting one packet, and uses the power consumed for transmitting one packet divided by the total number of bits contained in the packet to determine "the average amount of power consumption per bit", which is a power consumption evaluation index that the invention deals with.

The equation (4) is the average power consumption $\epsilon_{data}$ in the equation (3) expressed in an expanded form. The first term of the equation (4) is the average retransmission power consumption $\epsilon_{re-xmit}$ expressed in a functionalized form when a packet error occurs as illustrated in (2) or (3) in FIG. 5 and the packet is retransmitted according to the packet operation protocol defined in IEEE 802.11. The second term of the equation (4) is the power consumption (the transmission time: $T^m_{data}(L) \times$ the instantaneous power during transmission: Ptx (Pout)) necessary for the mobile terminal 2 to transmit a packet of L bytes to the access point 1, as shown in (1) in FIG. 5. The third term of the equation (4) represents the power consumption (the reception time: $(T^m_{ack/poll}+2aSIFSTime) \times$ the instantaneous power during reception: Prx) necessary for the mobile terminal 2 to receive the Ack and Poll packets sent from the access point 1, as shown in (1) in FIG. 5.

The equation (5) is the average power $\epsilon_{re-xmit}$ consumed for retransmission in the equation (4) expressed in an expanded form. The first term of the equation (5) represents a value obtained by multiplying the error occurrence probability during the transmission of the packet of L bytes as shown in (2) in FIG. 5 by the power consumption necessary for retransmitting one packet. The second term of the equation (5) represents a value obtained by multiplying the error occurrence probability during the reception of the Ack or Poll packet as shown in (3) in FIG. 5 by the power consumption necessary for receiving the packet again.

By thus determining the average power consumption generated by the error occurrence patterns shown in (1) to (3) in FIG. 5, it is possible to determine the power consumed for transmitting each one bit taking into account the occurrence probabilities of all error occurrence patterns.

Furthermore, focusing on the Ack/Poll frames in the equation (5) and assuming that the Ack/Poll frames transmitted from the access point 1 may be always modulated by using BPSK(½) and the length of the data packet transmitted from the mobile terminal 2 is 1500, the length of each of the Ack/Poll frames is sufficiently short compared to the length of the data packet, and the error occurrence probability also becomes sufficiently low. Specifically, the error rate $P^1_{e,ack/poll}$ during the frame transmission is sufficiently smaller than the error rate $P^1_{e,Ldata}$ during data packet transmission so that $(1-P^1_{e,ack/poll})$ can be approximated to 1. When the approximated version of the equation (5) is used to simplify the equation (4), it is seen from the equation (6) that the first term is formed of a function func1 that depends on the modulation mode m and the transmission power Pout as well as a constant cl, and the second term is formed of a function func2 that depends on the error rate derived from the modulation mode m and the reception C/N. Also as seen from the equation (6), the equation (4) can be expressed as the product of the first term term1 containing the variable m and the transmission output Pout and the second term term2 containing the variable m and C/N.

$$\epsilon'_{data} = \{T_{l,data}(m) \cdot P_{tx}(P_{out}) + \{T^1_{ack/poll} + 2 \cdot aSIFSTime\} \cdot Prx\} \cdot \quad (6)$$

$$\left\{ \sum_{i=1}^{\infty} P_{e,Ldata}(m, CN)^i \cdot (1 - P_{e,Ldata}(m, CN) \cdot i + 1 \right\}$$

$$= \{func1(m, P_{out}) + c1\} \cdot \{func2(P_{e,Ldata}(m, CN)) + 1\}$$

$$= term1(m, P_{out}) \cdot term2(m, CN)$$

Furthermore, by expressing both sides of the equation (6) in the logarithmic form, as shown in the equation (7), the relative power consumption $\log(\epsilon'_{data})$ can be calculated by summing log(term1) and log(term2). When the relative power consumption $\log(\epsilon'_{data})$ is minimized, the power consumption $\epsilon'_{data}$ is naturally minimized.

$$\log(\epsilon'_{data}) = \log(\text{term1}(m, P_{out})) + \log(\text{term2}(m, CN)) \quad (7)$$

The conversion table 18 of the mobile terminal 2 according to this embodiment stores m conversion tables table1$m$ that output log(term1) in response to the input of the transmission power level Pout and m conversion tables table2$m$ that output log(term2) in response to the input of C/N, where m represents the number of modulation modes. Thus, a capability of searching for the conversion table 18 and a capability for summing the first and second terms of the equation (7) will be enough to derive the optimum transmission power and modulation mode that provides minimum power consumption, eliminating the need for complex numerical calculation. That is, by using the power consumption calculation parameters, such as log(term1) and log(term2), to simplify the power consumption evaluation function, the optimum combination of the modulation mode and the transmission power can be efficiently derived with less calculation load.

Figure 6:
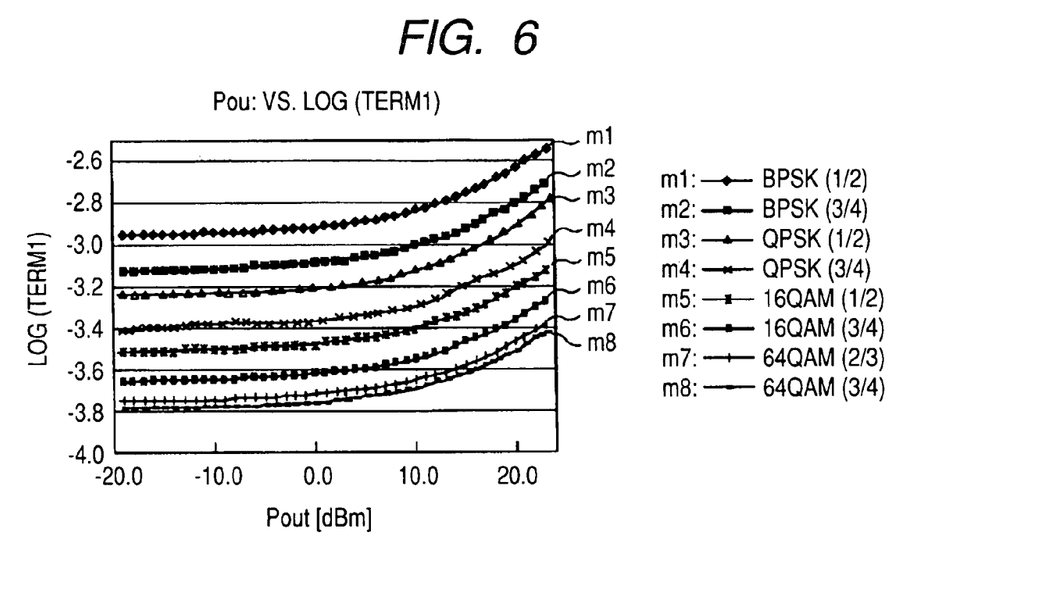
FIG. 6 shows graphs obtained by plotting values of log (term1) vs. values of the transmission output level Pout for respective modulation modes.

FIG. 6 shows graphs obtained by plotting values of log (term1) vs. values of the transmission output level Pout for respective modulation modes. These graphs correspond to the conversion tables table1 and are all monotone increasing functions for respective modulation modes.

Figure 7:
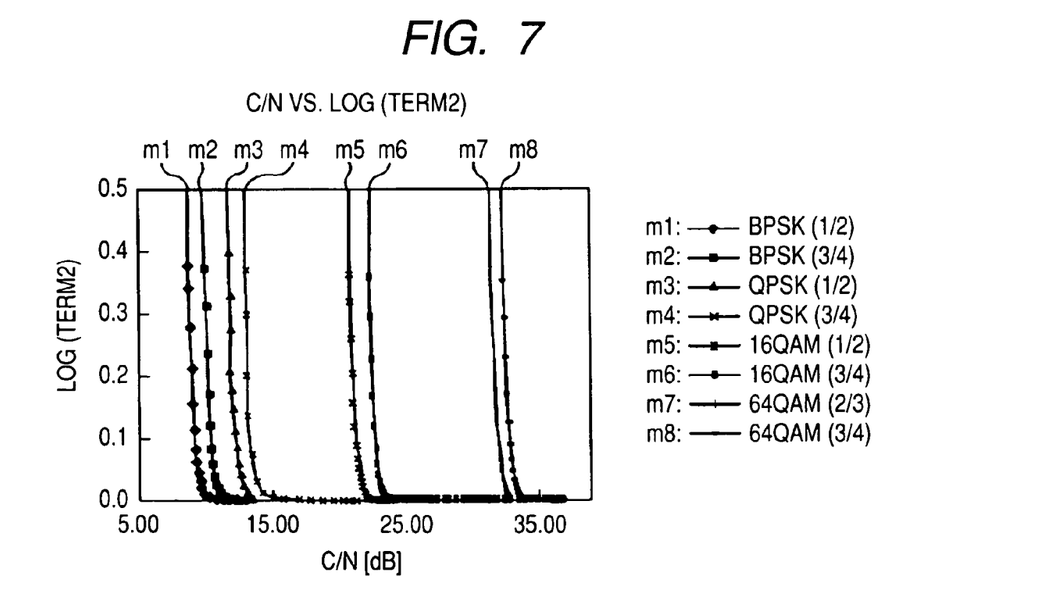
FIG. 7 shows graphs obtained by plotting values of log (term2) vs. C/N values for respective modulation modes.

FIG. 7 shows graphs obtained by plotting values of log (term2) vs. C/N values for respective modulation modes. These graphs correspond to the conversion tables table2 and are all monotone decreasing functions for respective modulation modes.

The transmission output level Pout and C/N have the following relationship:

$$CNR(dB) = Pout(dBm) - pathloss(dB) - noiselevel(dBm) \quad (8)$$

where pathloss represents the amount of signal attenuation on the transmission channel between the access point 1 and the mobile terminal 2, and noiselevel represents the amount of reception signal attenuation (fixed value) generated in the receiver.

Figure 8:
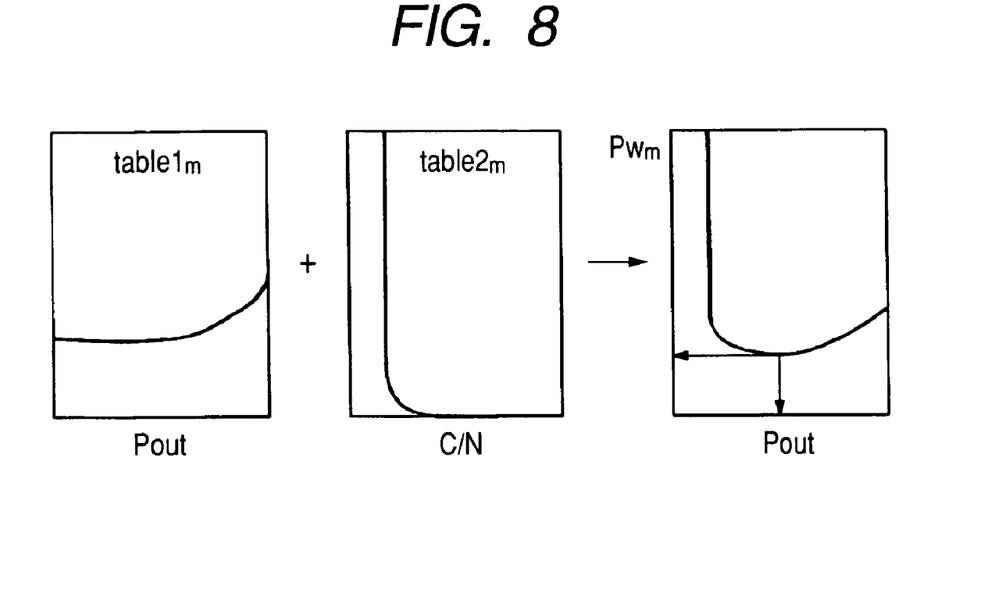
FIG. 8 diagrammatically shows how to calculate the amount of relative power consumption Pwm in the modulation mode m.

That is, as shown in FIG. 8, the horizontal axis C/N of the graph shown in FIG. 7 (table2) can be converted into the transmission output level Pout, so that the amount of relative power consumption Pwm in the modulation mode m can be determined by summation based on the conversion tables table1$m$ and table2$m$.

Figure 9:
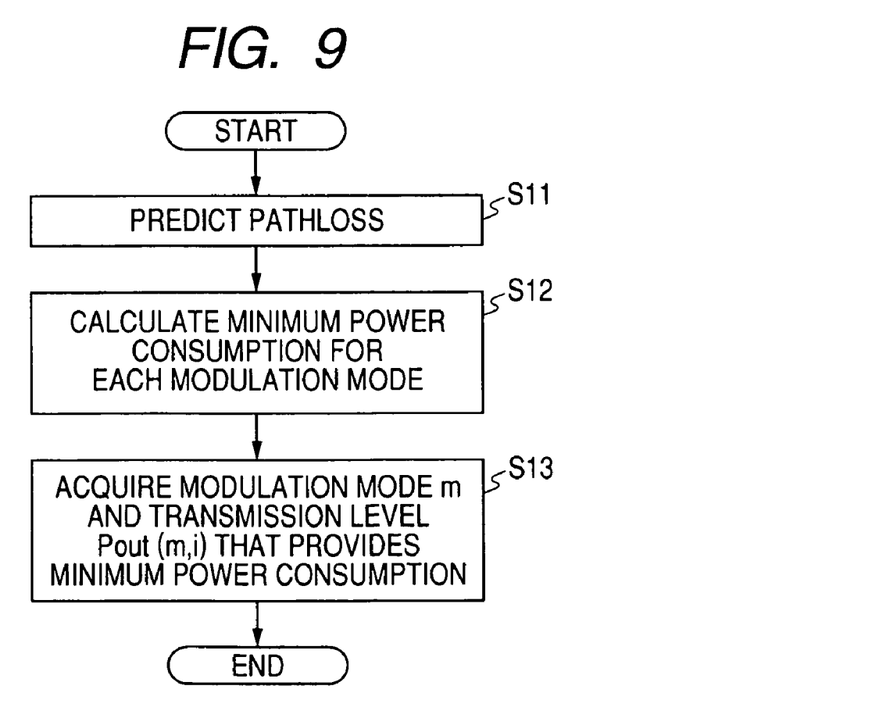
FIG. 9 is a flowchart showing a process for optimizing the two parameters of the transmission output level Pout and the modulation mode m.

Next, a process for optimizing the above two parameters of the transmission output level Pout and the modulation mode m will be described with reference to the flowchart shown in FIG. 9.

At the step S11, the pathloss prediction section 17 predicts the pathloss value based on the equation (8). For example, since the channel measurement request capability is defined in the IEEE 802.11h standard, the transmitting side can request the receiving side to submit a report on the reception level. This allows the mobile terminal 2 to predict pathloss generated along the transmission line between the transmitting side and the receiving side based on the report. Alternatively, a unique information exchange protocol between the access point 1 and the mobile terminal 2 may be defined to determine predicted pathloss. Still alternatively, a prediction method that does not use a feedback report, which will be described later, may be used.

At the step S12, in order to determine the minimum relative power consumption ($\log(\epsilon'_{data})$) for each modulation mode, the optimum power consumption calculator 19 uses the pathloss value predicted at the step S11 as well as the conversion tables table1$m$ and table2$m$ stored in the conversion table 18 to calculate the amount of relative power consumption Pw.

$$Pw(P_{out}(i), m) = \text{table1}_m(P_{out}(i)) + \text{table2}_m(CN(i)) \quad (9)$$

Pout(i) represents the transmission power level for a unit step i and ranges from Pout_min to Pout_max. CN(i) takes C/N values corresponding to the values ranging from Pout_min to Pout_max. That is, the optimum power consumption calculator 19 can use the pathloss value predicted at the step S11 to convert CN(i) into Pout(i), so as to acquire the amount of relative power consumption for every step i.

In the range from Pout_min to Pout_max, the minimum amount of relative power consumption can be expressed by the equation (10). This minimum amount of relative power consumption is calculated for every modulation mode m.

$$\text{min}MPw(m) = \min_{P_{out\_min} < P_{out}(i, m) < P_{out\_max}} Pw(P_{out}(i, m), m) \quad (10)$$

The Pw function described above is, as shown in FIG. 8, the sum of the monotone increasing function table1$m$ and the monotone decreasing function table2$m$ and has only one optimum solution, which is the minimum value. Furthermore, since the point where Pw transits from the decrease to the increase gives the optimum solution in the process of incrementing the unit step i, it is not necessary to perform calculation for every unit step i, allowing selection of an efficient calculation method. For example, use of the bisection method eliminates the need to perform calculation for every unit steps i of Pout(i), allowing reduction in the calculation load.

At the step S13, the optimum power consumption calculator 19 compares the minimum amount of relative power consumption among all modulation modes calculated at the step S12 to determine the modulation mode m that provides the minimum power consumption, and at the same time, determine the optimum transmission power level Pout(m, i)

$$\text{min}Pw = \min_{m_{min} \leq m \leq m_{max}} \text{min}MPw(m) \quad (11)$$

The modulation mode/transmission power controller 20 sets the modulation mode used in the baseband processor 14 and the transmission power in the PA 16 according to the modulation mode m and the transmission power level Pout (m, i) determined at the step S13.

Thus, the mobile terminal 2 can select the transmission power and the transmission mode in an optimum manner so as to minimize the amount of power consumed in the transmission process. As a result, the wireless LAN-equipped battery-driven communication terminal can operate longer in a continuous manner.

Derivation of the optimizing parameters only needs the conversion table, a simple addition/subtraction capability and a large/small comparison capability, and no enormous computation processing power for optimization is necessary, allowing easier implementation. Furthermore, less calculation load allows the optimizing parameters to quickly follow the new environment even when the transmission channel abruptly changes.

Although the relationship between C/N and Pout has been described with reference to the equation (8), the amount of actual propagation attenuation may always change and includes a measurement error, the C/N value may be provided with some margin. In this case, the equation (8) is defined by the following equation.

$$CNR(\text{dB}) = P\text{out}(\text{dBm}) - \text{pathloss}(\text{dB}) - \text{noiselevel}(\text{dBm}) - \text{margin}(\text{dB}) \quad (12)$$

When IEEE 802.11h is used for communication, the pathloss prediction section 17 can predict pathloss by using the receiving terminal to feed the reception level back to the transmitting side because the channel measurement command is defined in a series of processes of TPC (Transmit Power Control). However, implementing this reporting capability on the terminal side is optional and a wireless LAN network is formed of a plurality of mixed standards, such as IEEE 802.11a/b/g. Therefore, a network that does not have such feedback means predicts pathloss in the following manner.

In this case, the pathloss prediction section 17 includes a rough estimator using the reception level of a transmission packet from the receiver (the access point 1, in this example) to predict the reception level of a transmission packet to be transmitted from the mobile terminal 2 so as to roughly estimate predicted pathloss and a fine tuner using the transmitter (mobile terminal 2) detecting whether or not Ack has been received in response to the transmission packet to acquire the packet error rate (PER) and make fine tuning of the predicted pathloss.

Figure 10:
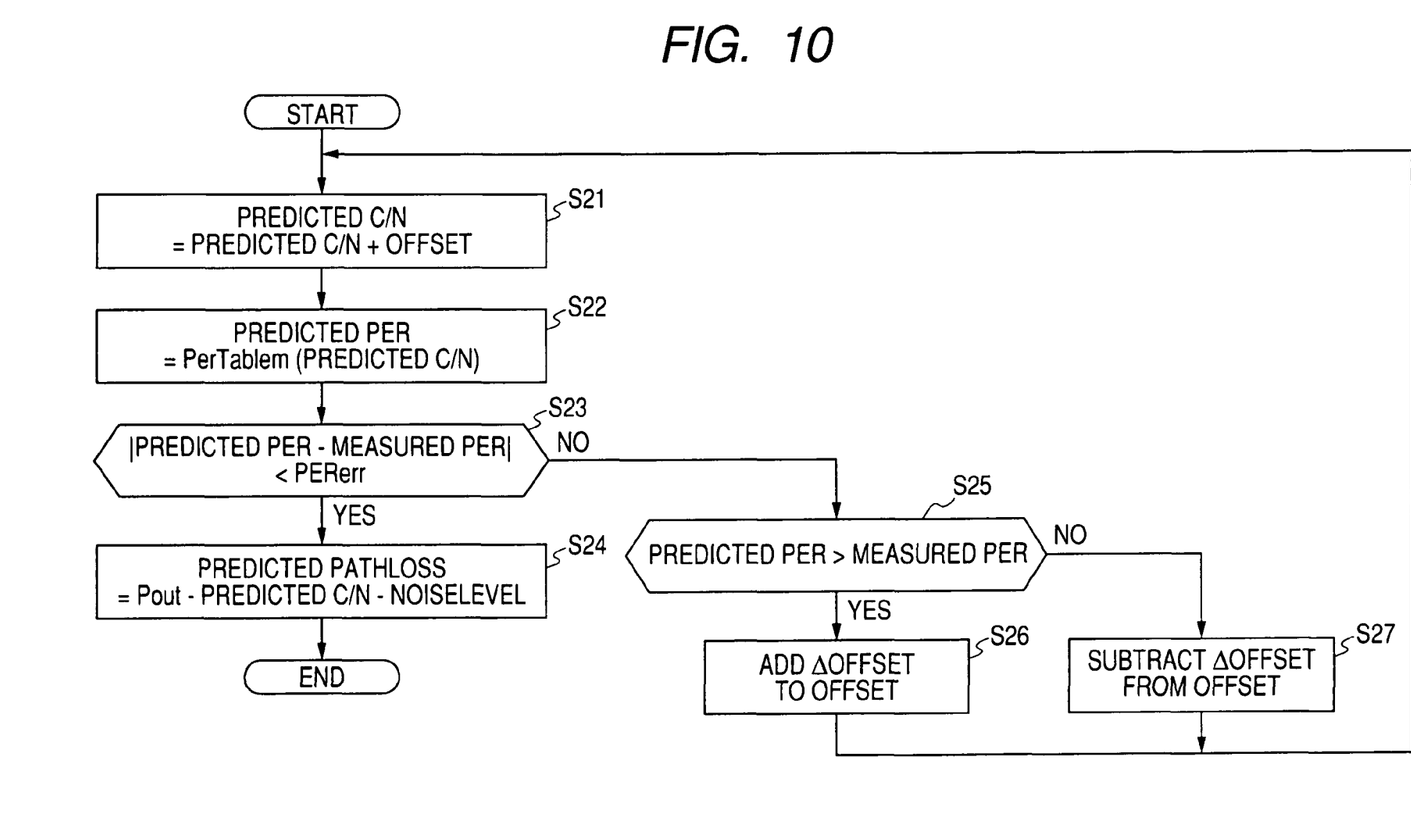
FIG. 10 is a flowchart showing one exemplary method for predicting pathloss.

FIG. 10 is a flowchart showing one exemplary method for predicting pathloss in a network that does not have feedback means. In this example, it is assumed that the amount of transmission signal attenuation generated along the transmission line from the transmitting terminal to the receiving terminal is substantially same as that generated along the transmission line from the receiving terminal to the transmitting terminal and both the transmitting and receiving terminals send transmission power of the same level. In this case, the reception signal level at the mobile terminal 2 can approximate the reception signal level at the access point 1. Therefore, the reception signal level is measured at the mobile terminal 2 and the resultant C/N is used as the measured C/N.

That is, at the step S21, the rough estimator uses the measured C/N to which a fixed value Offset is added as the predicted C/N on the access point 1 side.

Figure 11:
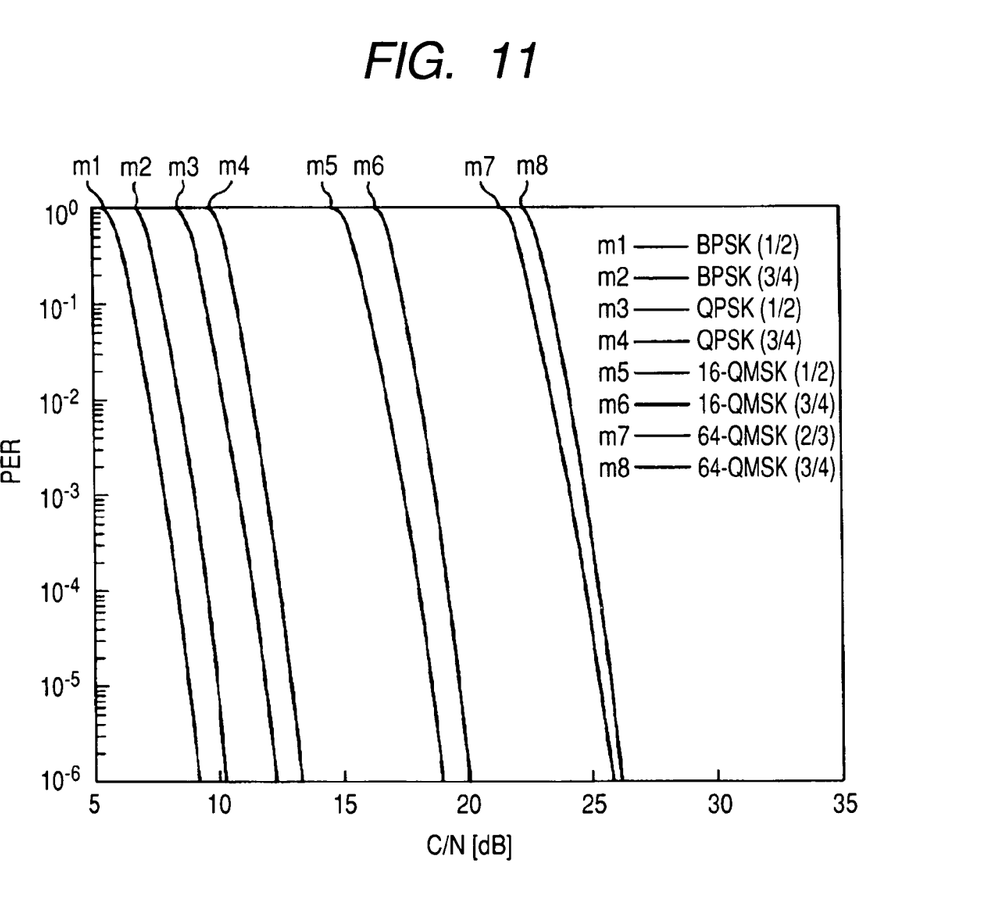
FIG. 11 shows graphs obtained by plotting values of PER vs. C/N values for respective modulation modes.

At the step S22, the rough estimator uses the PER vs. C/N conversion table shown in FIG. 11 to identify PER that would be generated upon reception on the access point 1 side according to the predicted C/N obtained at the step S21 and the present modulation mode. In this example, this PER is called predicted PER.

At the step S23, the fine tuner acquires PER on the receiver (mobile terminal 2) side. Specifically, the PER can be derived from the following equation in which when a data packet is transmitted, Ack returned from the access point 1 means successful transmission while no returned Ack means unsuccessful transmission. The PER thus derived is called measured PER.

$$PER = \text{unsuccessful transmission}/(\text{successful transmission} + \text{unsuccessful transmission}) \quad (13)$$

Then, the measured PER is compared with the predicted PER. When the difference between the two PERs is smaller than a certain constant range PERerr, it is judged that the difference between the predicted C/N predicted at the step S21 and the measured C/N+offset is sufficiently small. On the other hand, when the difference is greater than or equal to the certain constant range PERerr, it is judged that the difference between the predicted C/N and the measured C/N+offset is large.

At the step S23, when the difference between the predicted C/N and the measured C/N+offset is sufficiently small, the rough estimator acquires the predicted pathloss from the equation (8) (step S24). That is, the CNR in the equation (8) is replaced with the predicted C/N to acquire the predicted pathloss.

At the step S23, when the difference between the predicted C/N and the measured C/N+offset is large, the process proceeds to the step S25 and the predicted PER is compared with the measured PER. When the predicted PER is larger than the measured PER, the process proceeds to the step S26, while when the predicted PER is smaller than or equal to the measured PER, the process proceeds to the step S27.

At the step S26, the fine tuner adds Δoffset to the offset value that represents the error between the predicted C/N and the measured C/N. Similarly, at the step S27, Δoffset is subtracted from the offset. Then, after the step S26 or the step S27, the process returns to the step S21 and the pathloss prediction is performed again.

As described above, when the difference between the predicted PER according to the predicted C/N and the measured PER obtained by the reception of Ack is larger than a certain threshold value, the predicted C/N can be increased or decreased according to the comparison result between the predicted PER and the measured PER to correct the predicted C/N, allowing more accurate prediction of pathloss.

Therefore, even when the wireless LAN network in question does not have the feedback capability on the measurement result of the transmission channel characteristic defined in IEEE 802.11h, the measured reception level and the packet error rate can be used to perform correct channel prediction as described above, and the resultant prediction result can be used to select the optimum transmission power and modulation method to minimize the power consumption.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication apparatus that transmits a transmission signal and receives a reception signal via a wireless transmission channel, the wireless communication apparatus comprising:

means for determining a signal parameter corresponding to an expected received signal strength;

stored information providing a correlation between a level of the transmission signal and a first power consumption parameter for each modulation method employed by the communication apparatus;

additional stored information providing a correlation between the parameter corresponding to the signal strength for a received signal and a second power consumption calculation parameter for each modulation method employed by the communication apparatus;

means for determining the modulation method and the level of the transmission signal that provide minimum power consumption based on the stored information and/or additional stored information; and control means for selecting a modulation method and the level of the transmission signal which minimizes power consumption.

2. The wireless communication apparatus according to claim 1, wherein when a difference between a predicted packet error rate and measured packet error rate is larger than a certain threshold value, the parameter corresponding to the signal strength for a received signal is altered.

3. The wireless communication apparatus according to claim 2, wherein a predicted error rate is altered according to the comparison result between the predicted packet error rate and the measured packet error rate.

4. The wireless communication apparatus according to claim 1, wherein a calculation means converts C/N (Carrier to Noise) of the transmission signal into an expected level of the reception signal based on an expected amount of signal attenuation.

5. The wireless communication apparatus according to claim 1, wherein a calculation means determines the modulation method and the level of the transmission signal based on a transmission error probability of the reception signal.

6. A wireless communication method for transmitting a transmission signal and receiving a reception signal via a wireless transmission channel, the wireless communication method being executed by a microprocessor controlled system, the method comprising:
   determining a signal parameter corresponding to an expected received signal strength;
   determining a modulation method and level of the transmission signal that provide minimum power consumption based on the signal parameter corresponding to an expected received signal strength, stored information providing a correlation between the level of the transmission signal and a first power consumption parameter for each modulation method employed by the communication method and additional stored information providing a correlation between a signal parameter corresponding to an expected received signal strength and a second power consumption parameter for each modulation method; and
   selecting a modulation method and level of the transmission signal which minimizes power consumption.

7. A wireless communication apparatus that transmits a transmission signal and receives a reception signal via a wireless transmission channel, the wireless communication apparatus comprising:
   prediction means for determining a signal parameter corresponding to an expected received signal strength, and when the difference between a predicted packet error rate according to the expected received signal strength and a measured packet error rate is larger than a certain threshold value, adjusting the signal parameter corresponding to an expected received signal strength;
   circuitry for determining a modulation method and level of the transmission signal that provide minimum power consumption based on stored information providing correlation between transmission signal power and power consumption for a plurality of modulation methods and information providing correlation between received signal strength and power consumption for a plurality of modulation methods; and
   means for selecting the modulation method and the level of the transmission signal which minimize power consumption.

8. A wireless communication method for transmitting a transmission signal and receiving a reception signal via a wireless transmission channel, the wireless communication method being executed by a microprocessor controlled system, the method comprising:
   determining a signal parameter corresponding to an expected received signal strength, and when a difference between a predicted packet error rate corresponding to the expected received signal strength and a measured packet error rate is larger than a certain threshold value, adjusting the expected received signal strength;
   determining a modulation method and a level of the transmission signal that provide minimum communication power consumption; and
   selecting the modulation method and the level of the transmission signal which minimizes power consumption.

9. A signal level prediction apparatus that predicts an amount of signal transmitted through a wireless transmission channel, the signal level prediction apparatus comprising:
   prediction means for determining a parameter corresponding to an expected received signal strength; and,
   correction means for, when a difference between a predicted packet error rate according to the expected received signal strength and a measured packet error rate is larger than a certain threshold value, adjusting the expected received signal strength.

10. A signal level prediction method for determining an expected signal level for a signal transmitted through a wireless transmission channel, the signal level prediction method being executed by a microprocessor controlled system, the method comprising:
    determining a parameter corresponding to an expected received signal strength; and,
    when a difference between a predicted packet error rate according to the expected received signal strength and a measured packet error rate is larger than a certain threshold value, adjusting the expected received signal strength.

11. A wireless communication apparatus that transmits a transmission signal and receives a reception signal via a wireless transmission channel, the wireless communication apparatus comprising:
    a prediction unit which determines an expected amount of signal transmitted through the wireless transmission channel;
    stored information providing correlation between the level of the transmission signal and a power consumption parameter for each modulation method employed by the communication apparatus;
    additional stored information providing correlation between expected received signal strength and a power consumption parameter for each modulation method employed by the communication apparatus;
    circuitry determining the modulation method and the level of the transmission signal that provide minimum power consumption based on the stored information and/or additional stored information; and
    a controller selecting the modulation method and the level of the transmission signal which minimize power consumption.

12. A wireless communication apparatus that transmits a transmission signal and receives a reception signal via a wireless transmission channel, the wireless communication apparatus comprising:
    a received signal strength prediction unit which determines an expected signal strength by measuring the reception signal, and when a difference between a predicted packet error rate according to the predicted received signal strength and a measured packet error rate is larger than a certain threshold value, correcting the predicted received signal strength;
    circuitry calculating a modulation method and a level of the transmission signal that provide minimum communication power consumption based on stored information providing correlation between transmission level power consumption for each modulation method and reception level power consumption for each modulation method; and a controller selecting the modulation method and the level of the transmission signal which minimize power consumption.

13. A signal attenuation prediction apparatus that predicts an amount of signal attenuation along a wireless transmission channel, the signal attenuation prediction apparatus comprising:

a received signal strength prediction unit which determines a parameter corresponding to an expected received signal strength according to a measured signal strength;

a correction unit which, when a difference between a predicted packet error rate and a measured packet error rate is larger than a certain threshold value, increasing or decreasing the expected received signal strength.

* * * * *